(12) United States Patent
Vuppula et al.

(10) Patent No.: US 12,723,207 B2
(45) Date of Patent: Sep. 1, 2026

(54) METHODS FOR PROCESSING CONDENSATE FEEDSTOCKS

(71) Applicants: SABIC Global Technologies B.V., Bergen op Zoom (NL); Saudi Arabian Oil Company, Dhahran (SA)

(72) Inventors: Rajitha Vuppula, Bengaluru (IN); Vidya Sagar Guggilla, Bengaluru (IN); Gopal Juttu, Dhahran (SA)

(73) Assignees: SAUDI ARABIAN OIL COMPANY, Dhahran (SA); SABIC GLOBAL TECHNOLOGIES B.V., Bergen op Zoom (NL)

( * ) Notice: Subject to any disclaimer, the term of this patent is extended or adjusted under 35 U.S.C. 154(b) by 190 days.

(21) Appl. No.: 18/632,698

(22) Filed: Apr. 11, 2024

(65) Prior Publication Data

US 2025/0197741 A1 Jun. 19, 2025

(51) Int. Cl.
*C10G 63/04* (2006.01)
*B01D 3/06* (2006.01)
(Continued)

(52) U.S. Cl.
CPC ............... *C10G 63/04* (2013.01); *B01D 3/06* (2013.01); *B01D 3/14* (2013.01); *C10G 55/06* (2013.01);
(Continued)

(58) Field of Classification Search
CPC . A61N 1/057; B01D 3/06; B01D 3/14; C10G 11/18; C10G 2400/02;
(Continued)

(56) References Cited

U.S. PATENT DOCUMENTS 2,312,445 A 3/1943 Ruthruff
3,617,493 A 11/1971 Wirth et al.
(Continued)

FOREIGN PATENT DOCUMENTS

CN 115785999 A 3/2023
EP 2149594 A1 3/2010
(Continued)

OTHER PUBLICATIONS

Notification of Transmittal of the International Search Report and the Written Opinion of the International Searching Authority, or the Declaration dated Mar. 24, 2025 pertaining to International application No. PCT/US2024/059307 filed Dec. 10, 2024, pp. 1-13.
(Continued)

*Primary Examiner* — Ellen M McAvoy
*Assistant Examiner* — Chantel Graham
(74) *Attorney, Agent, or Firm* — DINSMORE & SHOHL LLP

(57) ABSTRACT

A method for processing a condensate feedstock may include passing the condensate feedstock to a first separation unit, and separating the condensate feedstock into at least a light fraction stream and a heavy fraction stream. Another method for processing a condensate feedstock may include passing the condensate feedstock to a first separation unit, and separating the condensate feedstock into at least a light fraction stream, an intermediate fraction stream, and a heavy fraction stream. Various downstream processing steps are further disclosed in the present disclosure.

20 Claims, 4 Drawing Sheets

(51) Int. Cl.
*B01D 3/14* (2006.01)
*C10G 55/06* (2006.01)

(52) U.S. Cl.
CPC ..... *C10G 2400/02* (2013.01); *C10G 2400/04* (2013.01); *C10G 2400/08* (2013.01); *C10G 2400/20* (2013.01)

(58) Field of Classification Search
CPC ............ C10G 2400/04; C10G 2400/08; C10G 2400/20; C10G 2400/30; C10G 51/04; C10G 51/06; C10G 55/06; C10G 63/04; C10G 69/00; C10G 69/04; C10G 69/06; C10G 9/36
See application file for complete search history.

(56) References Cited

U.S. PATENT DOCUMENTS

| | | | |
|---|---|---|---|
| 7,972,498 | B2 | 7/2011 | Buchanan et al. |
| 9,567,272 | B2 | 2/2017 | Mehlberg et al. |
| 10,259,758 | B2 | 4/2019 | Ward et al. |
| 10,793,787 | B2 | 10/2020 | Heraud et al. |
| 11,142,712 | B2 | 10/2021 | Koseoglu |
| 2019/0039970 | A1* | 2/2019 | Ward ..................... C10G 69/06 |
| 2021/0115340 | A1 | 4/2021 | Harandi et al. |
| 2021/0284921 | A1 | 9/2021 | Marri et al. |

FOREIGN PATENT DOCUMENTS

| | | | |
|---|---|---|---|
| EP | 3530718 | A1 | 8/2019 |
| RU | 2145337 | C1 | 2/2000 |
| WO | 2014123807 | A1 | 8/2014 |
| WO | 2015000841 | A1 | 1/2015 |
| WO | 2015000842 | A1 | 1/2015 |
| WO | 2020205210 | A1 | 10/2020 |
| WO | 2022072300 | A1 | 4/2022 |

OTHER PUBLICATIONS

Kusenberg et al., "Opportunities and challenges for the application of post-consumer plastic waste pyrolysis oils as steam cracker feedstocks: To decontaminate or not to decontaminate?", Waste Management, vol. 138, pp. 83-115, 2022.

* cited by examiner 101
108
110
112
120
122
124
130
132
150
152
154
156
158
172
174
178
180
182
184
190
192
194
196
198

METHODS FOR PROCESSING CONDENSATE FEEDSTOCKS

CROSS REFERENCE TO RELATED APPLICATION

This application claims the benefit of priority under 35 U.S.C. § 119 of India Provisional Application Ser. No. 202331085308 filed on Dec. 14, 2023, entitled "Methods for Processing Condensate Feedstocks," the entire contents of which are incorporated by reference into the present application.

TECHNICAL FIELD

Embodiments of the present disclosure generally relate to chemical processing and, more specifically, to processes and systems utilized to convert condensate feedstocks to other chemicals.

BACKGROUND

Chemicals such as light olefins and fuels are typically manufactured by thermal cracking of ethane, propane, butane and naphtha. For example, ethylene produced by thermal cracking makes up about 50% of the total ethylene production. However, as demand rises for these basic intermediate compounds, other production sources are considered beyond traditional thermal cracking and/or steam cracking processes utilizing the available feedstocks listed above.

SUMMARY

Globally, the production of condensates has steadily increased in the last few decades. However, the high amounts of naphthenic and aromatic content in the condensates feedstock typically amplify coke formation and fouling, particularly in steam crackers. This is one of the constraints to process condensate directly in a steam cracker. However, the present embodiments utilize condensates, such as those with an API gravity range from 45-55 degrees, to produce chemicals and fuels by fluid catalytic cracking ("FCC") processes. The present embodiments allow for the use of condensate feedstock to yield a relatively high amount of chemicals and fuels. In particular, it has been discovered that condensate conversion may be enhanced by separating the condensate feedstock into at least two process streams, and subjecting only the heavier stream to FCC processing, while allowing the lighter stream to bypass the FCC processing and be utilized in other downstream processing such as in a gasoline preparation unit or in a steam cracker.

According to one or more embodiments, a method for processing a condensate feedstock may comprise passing the condensate feedstock to a first separation unit, and separating the condensate feedstock into at least a light fraction stream and a heavy fraction stream. The light fraction stream may have a maximum boiling point that is about equal to a minimum boiling point of the heavy fraction stream. The light fraction stream may have a maximum boiling point of from 170° C. to 260° C. and the heavy fraction stream may have a minimum boiling point of from 170° C. to 260° C. At least 90 wt. % of the condensate feedstock may be contained in the combination of the light fraction stream and the heavy fraction stream. The method may further comprise cracking the heavy fraction stream in an FCC reactor to form an FCC effluent, passing the FCC effluent to a second separation unit to form a cat-cracked naphtha stream, and passing the cat-cracked naphtha stream and the light fraction stream to a gasoline preparation unit or to a mixed feed steam cracker unit.

According to one or more additional embodiments, a method for processing a condensate feedstock may comprise passing the condensate feedstock to a first separation unit, and separating the condensate feedstock into at least a light fraction stream, an intermediate fraction stream, and a heavy fraction stream. The light fraction stream may have a maximum boiling point that is about equal to a minimum boiling point of the intermediate fraction stream, and the intermediate fraction stream may have a maximum boiling point that is about equal to a minimum boiling point of the heavy fraction stream. The light fraction stream may have a maximum boiling point of from 170° C. to 200° C. and the intermediate fraction stream may have a minimum boiling point of from 170° C. 200° C. The intermediate fraction stream may have a maximum boiling point of from 230° C. to 380° C. and the heavy fraction stream may have a minimum boiling point of from 230° C. to 380° C. At least 90 wt. % of the condensate feedstock may be contained in the combination of the light fraction stream, the intermediate fraction stream, and the heavy fraction stream. The method may further comprise cracking the heavy fraction stream in an FCC reactor to form an FCC effluent, passing the FCC effluent to a second separation unit to form a cat-cracked naphtha stream, passing the cat-cracked naphtha stream and the light fraction stream to a catalytic reformer to form a reformer effluent, passing the reformer effluent and the intermediate fraction stream to a gasoline preparation unit.

These and other embodiments are described in more detail in the Detailed Description. It is to be understood that both the foregoing general description and the following detailed description present embodiments of the subject technology, and are intended to provide an overview or framework for understanding the nature and character of the described technology as it is claimed. The accompanying drawings are included to provide a further understanding of the presently disclosed technology and are incorporated into and constitute a part of this specification. The drawings illustrate various embodiments and, together with the description, serve to explain the principles and operations of the presently described technology. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

Figure 1:
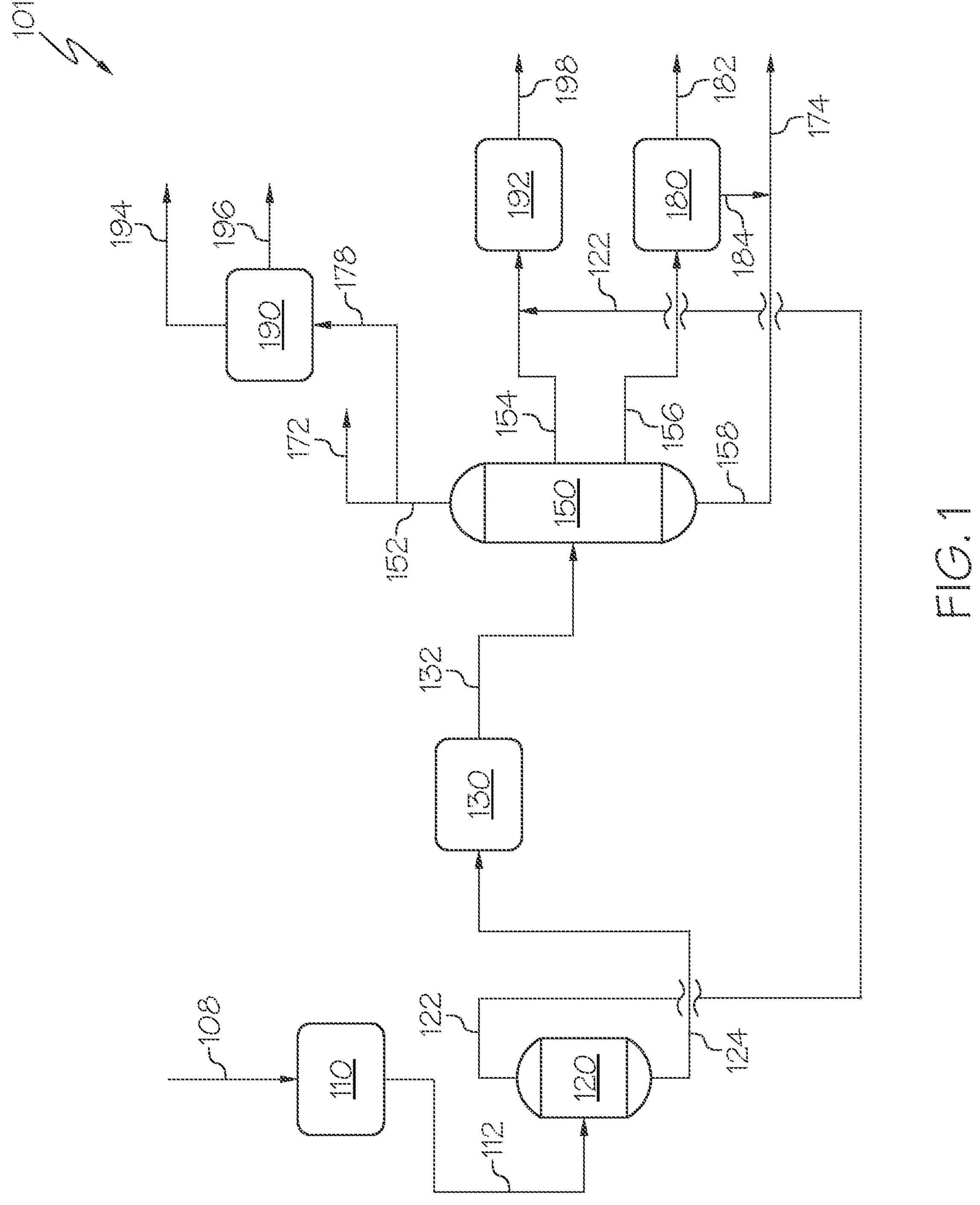
FIG. 1 schematically depicts a diagram of a condensate processing system, according to one or more embodiments described in this disclosure.

For the purpose of describing the simplified schematic illustrations and descriptions of the relevant figures, the numerous valves, temperature sensors, electronic controllers and the like that may be employed and well known to those of ordinary skill in the art of certain chemical processing operations are not included. Further, accompanying components that are often included in typical chemical processing operations, such as air supplies, catalyst hoppers, and flue gas handling systems, are not depicted. Accompanying components that are in hydrocracking units, such as bleed streams, spent catalyst discharge subsystems, and catalyst replacement sub-systems are also not shown. It should be understood that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component. It should be understood that arrows in the relevant figures are not indicative of necessary or essential steps.

It should be understood that according to the embodiments presented in the relevant figures, an arrow between two system components may signify that the stream is not processed between the two system components. In other embodiments, the stream signified by the arrow may have substantially the same composition throughout its transport between the two system components. Additionally, it should be understood that in one or more embodiments, an arrow may represent that at least 75 wt. %, at least 90 wt. %, at least 95 wt. %, at least 99 wt. %, at least 99.9 wt. %, or even 100 wt. % of the stream is transported between the system components. As such, in some embodiments, less than all of the streams signified by an arrow may be transported between the system components, such as if a slip stream is present.

It should be understood that two or more process streams are "mixed" or "combined" when two or more lines intersect in the schematic flow diagrams of the relevant figures. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments of the present disclosure relate to methods for processing condensate feedstocks. In general, and as is discussed herein, the condensate conversion systems receive condensate feedstock and output chemicals and/or transportation fuels. The embodiments of FIGS. 1-4 are similar or identical in many ways, respectively, but include differences as described herein. Description of the embodiments of FIGS. 1-4 may generally apply to the embodiments of the other figures, as would be understood by those skilled in the art. For example, concepts disclosed herein applicable to FIG. 1 may be equally applicable to FIG. 2, 3, or 4, and vice versa, even if not explicitly stated as such herein.

Generally, in the embodiments described herein, a heavier portion of the condensate feedstock is subjected to FCC processing, while one or more relatively light fractions bypass the FCC and are utilized in downstream fuel or chemical production. In such an arrangement, it has been discovered that greater yields of highly desired products, such as transportation fuels, aromatics, and/or light olefins, may be produced as compared to less desired products.

As used in this disclosure, a "reactor," such as an FCC reactor, described herein, refers to a vessel in which one or more chemical reactions may occur between one or more reactants optionally in the presence of one or more catalysts. For example, a reactor may include a tank or tubular reactor, a gas phase reactor, a continuous stirred-tank reactor (CSTR), or a plug flow reactor. Example reactors include fluidized bed reactors. Reactors, as described herein, may include a series of separate reactors. Additionally, reactors may include separation devices, such as those which separate catalyst from the reaction product. Such reactors may also include catalyst regeneration sections, as would be understood by those skilled in the art.

As used in this disclosure, a "catalyst" refers to any substance which increases the rate of a specific chemical reaction. Catalysts described in this disclosure may be utilized to promote various reactions, such as, but not limited to, cracking reactions. As used in this disclosure, a "cracking catalyst" increases the rate of a cracking reaction. Such catalysts may have dual functionality in some embodiments. The methods described herein should not necessarily be limited by specific catalytic materials. As described herein, the catalysts, including those use for cracking, may be fluidized in configuration and utilize gaseous reactants. However, other configurations are contemplated.

As used in this disclosure, a "separation unit" refers to any separation device or system of separation devices that at least partially separates one or more chemicals that are mixed in a process stream from one another. For example, a separation unit may selectively separate differing chemical species, phases, or sized material from one another, forming one or more chemical fractions. Examples of separation units include, without limitation, distillation columns, flash drums, knock-out drums, knock-out pots, centrifuges, cyclones, filtration devices, traps, scrubbers, expansion devices, membranes, solvent extraction devices, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation.

In one or more embodiments, a condensate feedstock is the primary or sole feed utilized to form chemical products. As described herein, a "condensate feedstock" generally refers to a hydrocarbon liquid that is condensed and formed when primarily gas is extracted from underground gas reservoirs, as is understood by those skilled in the art. Such condensate feedstocks may have chemical species as light as $C_3$ hydrocarbons and may have a final boiling point of at least 550° C., such as from 550° C. to 650° C. In some embodiments, the condensate feedstock may have a less than or equal to 2 wt. % boiling above 565° C. Such condensate feedstocks may be those produced from the Jafurah gas field in Saudi Arabia, termed herein as "Jafurah condensate". Typical example of Jafurah condensate feedstock compositions are provided in Table 1.

TABLE 1

| | Sample-1 (wt. %) | Sample-2 (wt. %) | Sample-3 (wt. %) |
|---|---|---|---|
| Properties: | | | |
| API Gravity | 48 | 46 | 49 |
| Total Sulfur (% wt) | 0.215 | 0.198 | 0.125 |
| Salt in Crude (PTB) | 12 | 7.27 | 0.89 |
| Density @ 60° F. (kg/cm3) | 0.7909 | 0.7962 | 0.7847 |
| Composition (wt %): | | | |
| C1-C4 | 1.5 | 0.3 | 0.4 |
| Naphtha to 185° C. | 37 | 34 | 40.7 |
| Kerosene 185° C.-245° C. | 13.7 | 14.9 | 17.6 |
| Gas oil 245° C.-365° C. | 25.4 | 27.1 | 25 |
| Vacuum gas oil 365° C.-565° C. | 19.8 | 21.2 | 14.3 |
| Residue >565° C. | 2.6 | 2.5 | 2 |

According to some embodiments, the condensate feedstocks described herein may have an API gravity of from 45 degrees to 55 degrees. For example, the condensate feedstocks described herein may have an API gravity of from 45 degrees to 46 degrees, from 46 degrees to 47 degrees, from 47 degrees to 48 degrees, from 48 degrees to 49 degrees, from 49 degrees to 50 degrees, from 50 degrees to 51 degrees, from 51 degrees to 52 degrees, from 52 degrees to 53 degrees, from 53 degrees to 54 degrees, from 54 degrees to 55 degrees, or any combination of one or more of these ranges.

Now referring to FIG. 1, condensate processing system 101 is depicted. The condensate processing system 101 may include at least a first separation unit 120, a FCC reactor 130, and a second separation unit 150. These system components will be described in detail herein.

According to one or more embodiments, the condensate feedstock may be passed to the first separation unit 120. Condensate feed stream 108 may consist of the condensate feedstock. In some embodiments, the condensate feedstock may be processed in a de-salter 110, which may remove at least a portion of salt from the condensate feedstock prior to passing the condensate feedstock to the first separation unit 120. It should be understood that some embodiments may not include a de-salter 110, and condensate feed stream 108 may be passed directly to the first separation unit 120. In embodiments that include a de-salter 110, condensate feedstock may be passed to the first separation unit 120 via condensate feed stream 112 after being de-salted in the de-salter 110. According to additional embodiments, and not shown in FIG. 1, the condensate feedstock may be further treated to remove other impurities, such as, and without limitation, alkali metals, nitrogen, sulfur. Such treatments may be by hydrotreatment of the condensate feedstock or use of single or multiple guard beds to remove the impurities in the feedstock.

Still referring to FIG. 1, according to embodiments, the condensate feedstock may be separated into at least two streams by the first separation unit 120. The first separation unit 120 may be any suitable separation unit, such as, and without limitation, a flash vessel or fractionator/distillation column that separates feedstock based on the boiling point at a specified cut point. As described herein, the "cut point" in a separation generally identifies the approximate final boiling point of a lighter fraction and approximate initial boiling point of a heavier fraction based on atmospheric pressure conditions. In some embodiments, such as depicted in FIG. 1, the condensate feed stream 112 is separated into only two streams, the light fraction stream 122 and the heavy fraction stream 124. If other streams are produced by the first separation unit 120 (besides the light fraction stream 122 and the heavy fraction stream 124), those streams may be only a relatively small portion of the condensate feed stream 112. For example, at least 90 wt. %, at least 95 wt. %, at least 99 wt. %, at least 99.9 wt. %, or 100 wt. % of the condensate feed stream 112 may be contained in the combination of the light fraction stream 122 and the heavy fraction stream 124.

According to embodiments, the cut point between the light fraction stream 122 and the heavy fraction stream 124 may be in a range of from 170° C. to 260° C. In such embodiments, the light fraction stream 122 may have a maximum boiling point of from 170° C. to 260° C. and the heavy fraction stream 124 may have a minimum boiling point of from 170° C. to 260° C. As depicted in FIG. 1, the heavy fraction stream 124 may be passed to the FCC reactor 130. According to one or more embodiments, from 50 wt. % to 70 wt. % of the condensate feed stream 112 may be contained in the heavy fraction stream 124. For example, from 55 wt. % to 65 wt. % of the condensate feed stream 112 may be contained in the heavy fraction stream 124.

Cracking of the heavy fraction stream 124 in the FCC reactor 130 may form an FCC effluent 132. As used in this disclosure, "cracking" may generally refer to a chemical reaction where a molecule having carbon to carbon bonds is broken into more than one molecule by the breaking of one or more of the carbon to carbon bonds, or is converted from a compound which includes a cyclic moiety, such as a cycloalkane, cycloalkane, naphthalene, an aromatic or the like, to a compound which does not include a cyclic moiety or contains fewer cyclic moieties than prior to cracking. Cracking may also include reduction in alkene bonds (i.e., transformation of alkene bonds to alkane bonds). As is well understood by those skilled in the art, FCC is an abbreviation for fluid catalytic cracking, which generally refers to utilizes fluidized catalytic particles which contact a feed that is a gas phase. It is contemplated that a wide variety of catalyst may be utilized in the FCC reactor 130. For example, zeolitic catalysts may be suitable. The FCC reactor 130 may operate as a riser or downer, and should not be limited by specific process conditions such as temperature, pressure, residence time, catalyst composition, and/or catalyst to feed ratio. However, according to some embodiments, the FCC reactor 130 may operate with a reactor temperature of from 500° C. to 700° C., a catalyst to feed ratio by weight in the FCC reactor 130 of from 1 to 50, and/or a residence time of the FCC reactor 130 of from 0.1 s to 10 s.

Following cracking of the heavy fraction stream 124, resulting in the formation of the FCC effluent 132, the FCC effluent 132 may be passed to the second separation unit 150. The second separation unit 150 may be a distillation column, according to some embodiments, as is depicted in FIG. 1. However, a series of separation devices may be utilized, as would be recognized by those skilled in the art. Various downstream separated streams may be formed by the separation of the FCC effluent 132. For example, in some embodiments, effluents of the second separation unit 150 (the downstream separated streams) may include fuel gas 172, stream 178 that includes liquefied petroleum gas (LPG) along with $C_3$-$C_4$ light olefins, cat-cracked naphtha 154, light cycle oil 156, and heavy cycle oil 158. While these downstream separated streams may sometimes vary in composition, in general, the fuel gas 172 includes $H_2$ and C1-$C_2$ species, stream 178 includes the liquefied petroleum gas which includes $C_3$-$C_4$ paraffins along with $C_3$-$C_4$ light olefins, the cat-cracked naphtha 154 (catalyst cracked naphtha) includes $C_5$ hydrocarbons up to about 220° C. boiling point hydrocarbons (e.g., boiling in a range of rom 210° C. to 230° C.), and the light cycle oil 156 include hydrocarbons boiling from about 220° C. (e.g., in a range from 210° C. to 230° C.) to about 350° C. (e.g., in range from 340° C. to 360° C.). The heavy cycle oil 158 may include hydrocarbons boiling over about 350° C. (e.g., in a range from 340° C. to 360° C.).

Still referring to FIG. 1, in some embodiments, the fuel gas 172 and stream 178 may exit the second separation unit 150 as stream 152 and be separated into respective streams. The fuel gas 172 may be utilized as a product stream, or may be utilized in the condensate processing system 101 as a fuel for, e.g., closing the heat balance of the FCC reactor 130. Stream 172 may also be sent to further downstream unit such as the olefin separation unit 190 where stream 172 is separated into olefins 194 and non-olefins 196.

According to some embodiments, the stream 178 may be passed to an olefin separation unit 190, where stream 178 is separated into olefins 194 and non-olefins 196.

Still referring to FIG. 1, according to one or more embodiments, the cat-cracked naphtha 154 and the light fraction stream 122 may be passed to a gasoline preparation unit 192, which produces gasoline 198. The light fraction stream 122 and the FCC effluent 132 may be combined and then passed together to the gasoline preparation unit 192, as is depicted in FIG. 1, or may be separately passed in separate streams to the gasoline preparation unit 192. The gasoline preparation unit 192 may be a gasoline hydrotreater, similar to a naphtha preparation unit. The target of this unit may be to produce a material that will either meet gasoline specifications or can be blended with other suitable material in order to meet gasoline specifications.

Without being bound by any particular theory, it is believed that passing the light fraction stream 122 to the gasoline preparation unit 192 (that is, bypassing the FCC reactor 130) may increase yields of fuels as well as other chemicals such as light olefins. It is believed that, in some embodiments, yields of from 30 wt. % to 50 wt. % of fuels (such as gasoline and diesel) and from 20 wt. % to 40 wt. % of high value chemicals such as light olefins (i.e., ethylene, propylene, butylene) and/or aromatics (e.g., toluene, benzene, and mixed xylenes) may be produced from the described condensate feed streams by the methods described with respect to the embodiment of FIG. 1.

Still referring to FIG. 1, the light cycle oil 156 may be passed to the diesel preparation unit 180, which may form diesel 182. The diesel preparation unit 180 may be a typical diesel hydrotreating unit or a mild hydrocracker. In some embodiments, the diesel preparation unit 180 may be an LCO (Light Cycle Oil) hydrotreating/mild hydrocracking unit operating with a target to produce material that can be either sold as diesel or blended with other diesel components. A typical unit may operate at 350-420° C. and a pressure of 50-100 barg. A variety of available mild hyrocracking catalyst (CoMo or NiMo catalysts) may be used.

Still referring to FIG. 1, the heavy cycle oil 158 exiting the second separation unit 150 may be passed out of the condensate processing system 101 as fuel oil 174. Additionally, the diesel preparation unit 180 may form fuel oil 184 that is passed out of the condensate processing system 101, and may be combined with the heavy cycle oil 158 as shown in the embodiment of FIG. 1.

Figure 2:
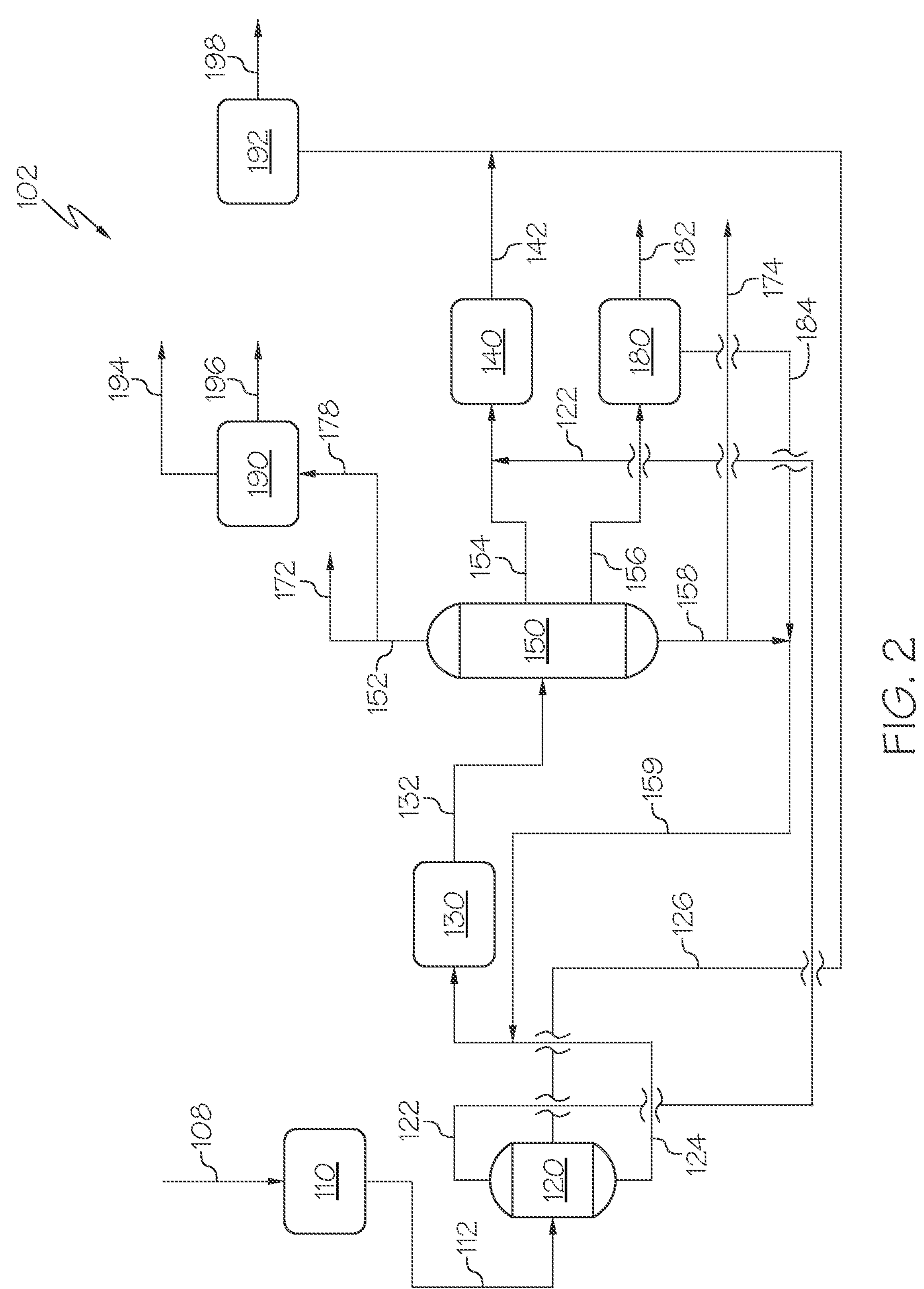
FIG. 2 schematically depicts a diagram of another condensate processing system, according to one or more embodiments described in this disclosure.

Now referring to FIG. 2, another condensate processing system 102 is depicted. The condensate processing system 102 may be similar or identical to the condensate processing system 101 of FIG. 1 except where described otherwise. In particular, and as described herein, the condensate processing system 102 may separate the condensate feed stream 112 into at least three fractions and the two lightest fractions may bypass the FCC reactor 130 and be sent to the gasoline preparation unit 192.

According to one or more embodiments, and as depicted in FIG. 2, the first separation unit 120 may separate the condensate feed stream 112 into at least a light fraction stream 122, an intermediate fraction stream 126, and a heavy fraction stream 124. Generally, the light fraction stream 122 may have lighter components than the intermediate fraction stream 126, and the intermediate fraction stream 126 may have lighter components than the heavy fraction stream 124. If other streams are produced by the first separation unit 120 (besides the light fraction stream 122, the intermediate fraction stream 126, and the heavy fraction stream 124), those streams may be only a relatively small portion of the condensate feed stream 112. For example, at least 90 wt. %, at least 95 wt. %, at least 99 wt. %, at least 99.9 wt. %, or 100 wt. % of the condensate feed stream 112 may be contained in the combination of the light fraction stream 122, the intermediate fraction stream 126, and the heavy fraction stream 124.

According to embodiments, the cut point between the light fraction stream 122 and the intermediate fraction stream 126 may be in a range of from 170° C. to 200° C. In such embodiments, the light fraction stream 122 may have a maximum boiling point of from 170° C. to 200° C. and the intermediate fraction stream 126 may have a minimum boiling point of from 170° C. to 200° C. The cut point between the intermediate fraction stream 126 and the heavy fraction stream 124 may be in a range of from 205° C. to 235° C. In such embodiments, the intermediate fraction stream 126 may have a maximum boiling point of from 205° C. to 235° C. and the heavy fraction stream 124 may have a minimum boiling point of from 205° C. to 235° C.

Similar to as described with respect to the embodiments of FIG. 1, in the embodiments of FIG. 2 the heavy fraction stream 124 is passed to the FCC reactor 130 to form the FCC effluent 132 and the FCC effluent 132 is separated into at least the fuel gas 172, the liquefied petroleum gas, the cat-cracked naphtha 154, the light cycle oil 156, and the heavy cycle oil 158. Processing of the liquefied petroleum gas downstream of the second separation unit 150 may be similar or identical to that described with respect to the embodiment of FIG. 1.

According to one or more embodiments, the cat-cracked naphtha 154 and the light fraction stream 122 may be passed to a catalytic reformer 140. The light fraction stream 122 and the cat-cracked naphtha 154 may be combined and then passed together to the catalytic reformer 140, as is depicted in FIG. 2, or may be separately passed in separate streams to the catalytic reformer 140. The catalytic reformer 140 may operate to increase the octane rating of the hydrocarbons and form the reformer effluent 142. Without limitation, the reforming process may convert low-octane linear hydrocarbons (paraffins) into branched alkanes (isoparaffins) and cyclic naphthenes, which may then be partially dehydrogenated to produce high-octane aromatic hydrocarbons.

Still referring to FIG. 2, the reformer effluent 142 and the intermediate fraction stream 126 may be passed to the gasoline preparation unit 192 to form gasoline 198. The reformer effluent 142 and the intermediate fraction stream 126 may be combined and then passed together to the gasoline preparation unit 192, as is depicted in FIG. 2, or may be separately passed in separate streams to the gasoline preparation unit 192.

In some embodiments, the diesel preparation unit 180 may form fuel oil 184 that may be passed to the FCC reactor 130 as a recycle stream. Additionally, the heavy cycle oil 158 may be passed to the FCC reactor 130 as a recycle stream. In such embodiments, the fuel oil 184 and the heavy cycle oil 158 may be combined to form stream 159, which may be combined with the heavy fraction stream 124 or passed separately to the FCC reactor 130.

Without being bound by any particular theory, it is believed that passing the light fraction stream 122 and the intermediate fraction stream 126 to the gasoline preparation unit 192 (that is, bypassing the FCC reactor 130) may increase yields of fuels as well as other chemicals such as light olefins. It is believed that, in some embodiments, yields of from 50 wt. % to 70 wt. % of fuels (such as gasoline and diesel) and from 20 wt. % to 30 wt. % of high value chemicals such as light olefins (i.e., ethylene, propylene, butylene) and/or aromatics (e.g., toluene, benzene, and mixed xylenes) may be produced from the described condensate feed streams by the methods described with respect to the embodiment of FIG. 2.

Figure 3:
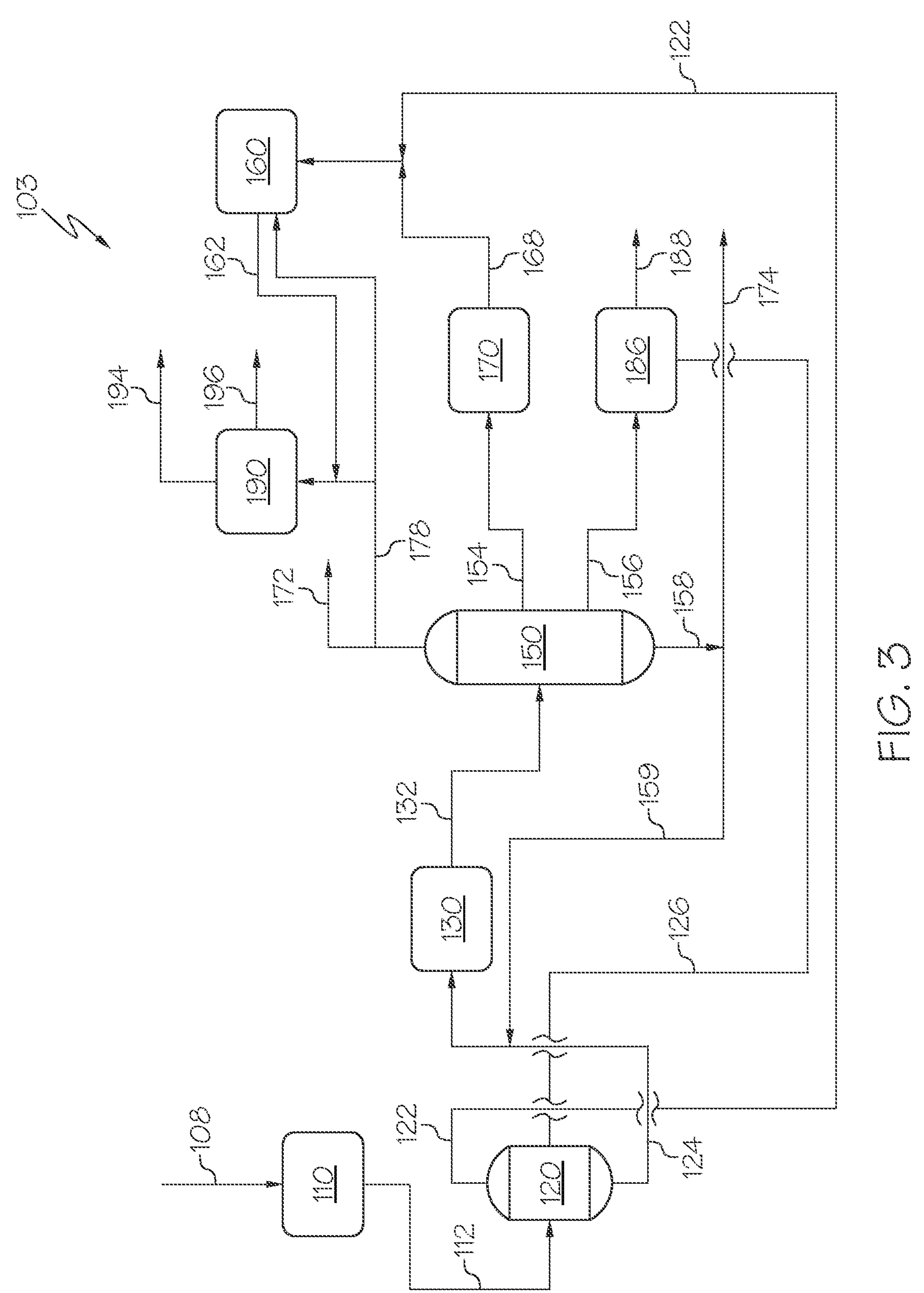
FIG. 3 schematically depicts a diagram of another condensate processing system, according to one or more embodiments described in this disclosure.

Now referring to FIG. 3, another condensate processing system 103 is depicted. The condensate processing system 103 may be similar or identical to the condensate processing system 101 of FIG. 1 and/or the condensate processing system 102 of FIG. 2 except where described otherwise. In particular, and as described herein, the condensate processing system 103 may separate the condensate feed stream 112 into at least three fractions (like that of FIG. 2) and the two lightest fractions may bypass the FCC reactor 130, where the light fraction stream 122 may be passed to a and be sent to a mixed feed steam cracker unit 160 and the intermediate fraction stream 126 may be passed to a kerosene preparation unit 186 to form kerosene 188.

According to one or more embodiments, and as depicted in FIG. 3, the first separation unit 120 may separate the condensate feed stream 112 into at least a light fraction stream 122, an intermediate fraction stream 126, and a heavy fraction stream 124. Generally, the light fraction stream 122 may have lighter components than the intermediate fraction stream 126, and the intermediate fraction stream 126 may have lighter components than the heavy fraction stream 124. If other streams are produced by the first separation unit 120 (besides the light fraction stream 122, the intermediate fraction stream 126, and the heavy fraction stream 124), those streams may be only a relatively small portion of the condensate feed stream 112. For example, at least 90 wt. %, at least 95 wt. %, at least 99 wt. %, at least 99.9 wt. %, or 100 wt. % of the condensate feed stream 112 may be contained in the combination of the light fraction stream 122, the intermediate fraction stream 126, and the heavy fraction stream 124.

According to embodiments, the cut point between the light fraction stream 122 and the intermediate fraction stream 126 may be in a range of from 170° C. to 200° C. In such embodiments, the light fraction stream 122 may have a maximum boiling point of from 170° C. to 200° C. and the intermediate fraction stream 126 may have a minimum boiling point of from 170° C. to 200° C. The cut point between the intermediate fraction stream 126 and the heavy fraction stream 124 may be in a range of from 205° C. to 235° C. In such embodiments, the intermediate fraction stream 126 may have a maximum boiling point of from 205° C. to 235° C. and the heavy fraction stream 124 may have a minimum boiling point of from 205° C. to 235° C.

Similar to as described with respect to the embodiments of FIGS. 1 and 2, in the embodiments of FIG. 3 the heavy fraction stream 124 is passed to the FCC reactor 130 to form the FCC effluent 132 and the FCC effluent 132 is separated into at least the fuel gas 172, the liquefied petroleum gas, the cat-cracked naphtha 154, the light cycle oil 156, and the heavy cycle oil 158.

According to embodiments, the cat-cracked naphtha 154 may be passed to the saturation unit 170. The saturation unit 170 may operate to saturate diolefins in the cat-cracked naphtha 154 and improve the olefins content in order to improve yields in the mixed feed steam cracker unit 160. The saturation unit 170 may be a typical naphtha/gasoline hydrotreater that operates at 200-270° C. at a pressure of 25-45 barg with a CoMo hydrotreating catalyst. The saturation unit effluent 168 may exit the saturation unit 170.

Still referring to FIG. 3, the saturation unit effluent 168 and the light fraction stream 122 may be passed to the mixed feed steam cracker unit 160. In some embodiments, such as depicted in FIG. 3, the saturation unit effluent 168 and the light fraction stream 122 are combined prior to being passed to the mixed feed steam cracker unit 160, while in other embodiments the saturation unit effluent 168 and the light fraction stream 122 may be separately passed to the mixed feed steam cracker unit 160. Additionally, the liquefied petroleum gas may be passed to the mixed feed steam cracker unit 160, either alone or in combination with other streams such as the saturation unit effluent 168 and/or the light fraction stream 122.

Still referring to FIG. 3, the heavy cycle oil 158 exiting the second separation unit 150 may be passed out of the condensate processing system 103 as fuel oil 174. In some embodiments, a portion of the heavy cycle oil 158 may be passed via stream 159 to the FCC reactor 130 as a recycle stream, where in some embodiments the stream 159 is combined with the heavy fraction stream 124 and such combined stream is passed to the FCC reactor 130.

The mixed feed steam cracker unit 160 may be a combination of different thermal (pyrolysis) steam cracking furnaces that can process feeds such as ethane, propane, butanes, as well as liquids such as naphtha (low or no olefin content) and gas oils (boiling between 180° C. up to 365° C.). Typically, each furnace may be customized (coil material of construction, layout and residence times) to crack a narrow boiling point range of material. Multiple cracking furnaces in the mixed feed steam cracker unit 160 may operate in parallel processing different cuts. The products from each furnace can be combined and processed in a downstream olefins separation section that can be integrated with the catalytic cracking downstream section. The thermal cracking furnaces may operate at outlet temperatures between 700° C. to 900° C. and an inlet pressure of 1.5 barg or greater. The stream cracked effluent 162 and/or a portion of the liquefied petroleum gas may be passed to the olefin separation unit 190 where the stream 178 is separated into olefins 194 and non-olefins 196.

Still referring to FIG. 3, the intermediate fraction stream 126 and the light cycle oil 156 may be passed to a kerosene preparation unit 186 to form kerosene 188. The light cycle oil 156 and the intermediate fraction stream 126 may be separately passed to the kerosene preparation unit 186, or may be combined prior to entering the kerosene preparation unit 186.

Without being bound by any particular theory, it is believed that passing the light fraction stream 122 to the mixed gas steam cracker unit 160 and the intermediate fraction stream 126 to the kerosene preparation unit 186 (that is, bypassing the FCC reactor 130) may increase yields of fuels as well as other chemicals such as light olefins. It is believed that, in some embodiments, yields of from 40 wt. % to 60 wt. % of fuels (such as gasoline and diesel) and from 20 wt. % to 30 wt. % of high value chemicals such as light olefins (i.e., ethylene, propylene, butylene) and/or aromatics (e.g., toluene, benzene, and mixed xylenes) may be produced from the described condensate feed streams by the methods described with respect to the embodiment of FIG. 3.

Figure 4:
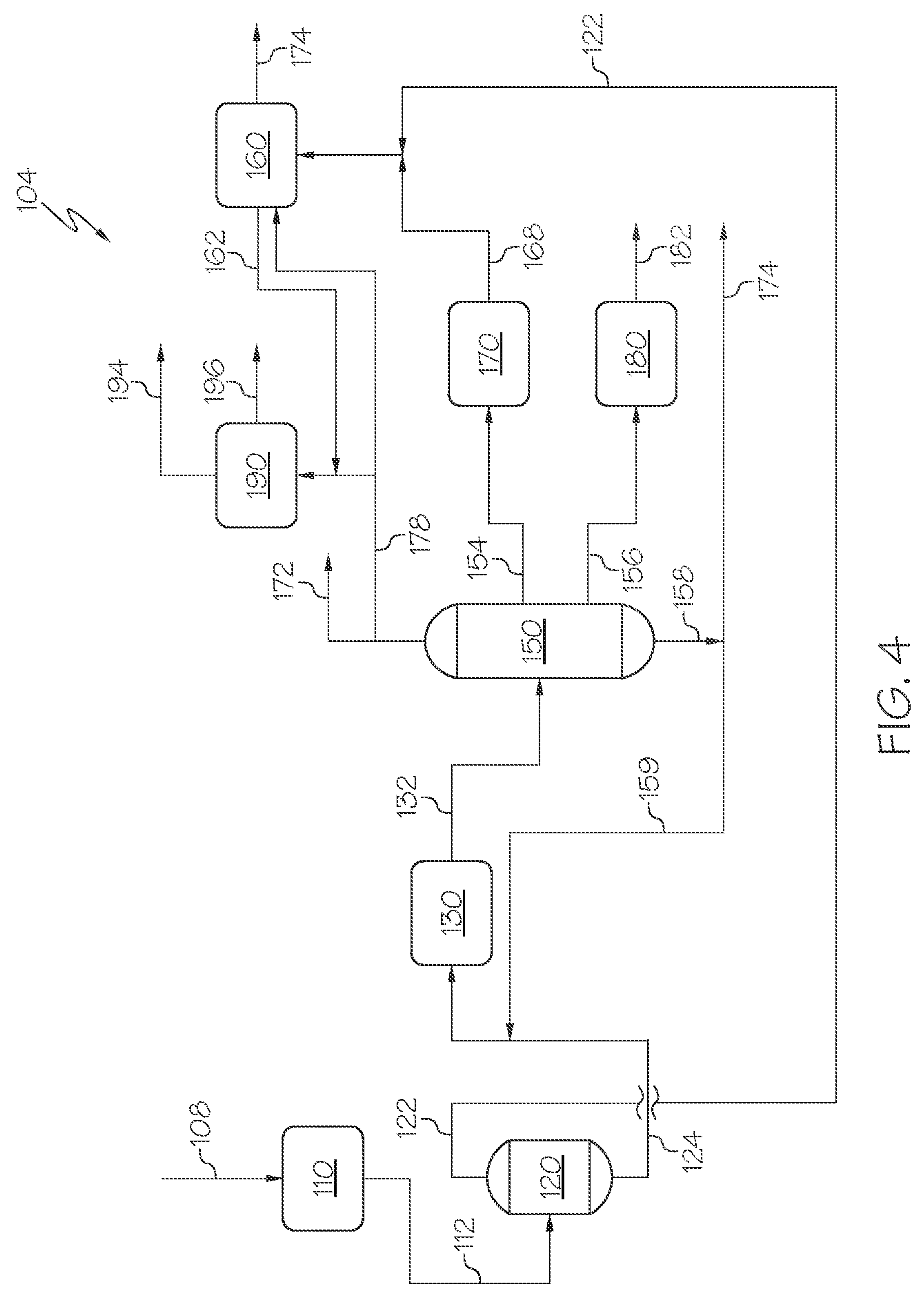
FIG. 4 schematically depicts a diagram of yet another condensate processing system, according to one or more embodiments described in this disclosure.

Now referring to FIG. 4, another condensate processing system 104 is depicted. The condensate processing system 104 may be similar or identical to the condensate processing system 101 of FIG. 1, the condensate processing system 102 of FIG. 2, and/or the condensate processing system 103 of FIG. 3 except where described otherwise. In particular, and as described herein, the condensate processing system 104 may separate the condensate feed stream 112 into at least two fractions and the lightest fractions may bypass the FCC reactor 130 and be sent to a mixed feed steam cracker unit 160.

As shown in FIG. 4, according to embodiments, the cut point between the light fraction stream 122 and the heavy fraction stream 124 may be in a range of from 170° C. to 260° C. In such embodiments, the light fraction stream 122 may have a maximum boiling point of from 170° C. to 260° C. and the heavy fraction stream 124 may have a minimum boiling point of from 170° C. to 260° C. In additional embodiments, the cut point between the light fraction stream 122 and the heavy fraction stream 124 may be in a range of from 170° C. to 200° C., wherein the light fraction stream 122 may have a maximum boiling point of from 170° C. to 200° C. and the heavy fraction stream 124 may have a minimum boiling point of from 170° C. to 200° C. In additional embodiments, the cut point between the light fraction stream 122 and the heavy fraction stream 124 may be in a range of from 230° C. to 260° C., wherein the light fraction stream 122 may have a maximum boiling point of from 230° C. to 260° and the heavy fraction stream 124 may have a minimum boiling point of from 230° C. to 260° C.

As compared with the embodiment of FIG. 3, the processing downstream of the second separation unit 150 may be similar or identical in many respects. That is the light fraction stream 122 is passed to the mixed feed steam cracker unit 160, like in FIG. 3. Additionally, the processing of the liquefied petroleum gas is similar or identical to that in the embodiment of FIG. 3. Similar to FIG. 3, the cat-cracked naphtha 154 may be passed to the saturation unit 170. However, in the embodiment of FIG. 4, the light cycle oil 156 is passed to a diesel preparation unit 180, which may form diesel 182. Additionally, according to FIG. 4, a portion of the inputs to the mixed feed steam cracker unit 160 may form fuel oil 174 which may exit the condensate processing system 104. Also like in the embodiment of FIG. 3, a portion of the heavy cycle oil 158 may be recycled and passed to the FCC reactor 130.

Without being bound by any particular theory, it is believed that passing the light fraction stream 122 to the mixed feed steam cracker unit 160 (that is, bypassing the FCC reactor 130) may increase yields of fuels as well as other chemicals such as light olefins. It is believed that, in some embodiments, such as those where the cut point in the first separation unit 120 is from 170° C. to 200° C., yields of from 30 wt. % to 50 wt. % of fuels (such as gasoline and diesel) and from 40 wt. % to 60 wt. % of high value chemicals such as light olefins (i.e., ethylene, propylene, butylene) and/or aromatics (e.g., toluene, benzene, and mixed xylenes) may be produced from the described condensate feed streams by the methods described with respect to the embodiment of FIG. 4. Additionally, It is believed that, in some embodiments, such as those where the cut point in the first separation unit 120 is from 230° C. to 260° C., yields of from 20 wt. % to 40 wt. % of fuels (such as gasoline and diesel) and from 50 wt. % to 70 wt. % of high value chemicals such as light olefins (i.e., ethylene, propylene, butylene) and/or aromatics (e.g., toluene, benzene, and mixed xylenes) may be produced from the described condensate feed streams by the methods described with respect to the embodiment of FIG. 4.

The present description includes numerous non-limiting aspects, listed as Aspects 1-15 hereinbelow.

Aspect 1. A method for processing a condensate feedstock, the method comprising: passing the condensate feedstock to a first separation unit, and separating the condensate feedstock into at least a light fraction stream and a heavy fraction stream, wherein: the light fraction stream has a maximum boiling point that is about equal to a minimum boiling point of the heavy fraction stream; the light fraction stream has a maximum boiling point of from 170° C. to 260° C. and the heavy fraction stream has a minimum boiling point of from 170° C. to 260° C.; and at least 90 wt. % of the condensate feedstock is contained in the combination of the light fraction stream and the heavy fraction stream; cracking the heavy fraction stream in an FCC reactor to form an FCC effluent; passing the FCC effluent to a second separation unit to form a cat-cracked naphtha stream; passing the cat-cracked naphtha stream and the light fraction stream to a gasoline preparation unit or to a mixed feed steam cracker unit.

Aspect 2. The method of claim 1, wherein one or more of: the condensate feedstock has an API gravity of from 45 degrees to 55 degrees; the condensate feedstock has a final boiling point of from 550 to 650° C.; or the condensate feedstock has less than or equal to 2 wt. % boiling above 565° C.

Aspect 3. The method of any previous claim, further comprising removing at least a portion of salt from the condensate feedstock prior to passing the condensate feedstock to the first separation device.

Aspect 4. The method of any previous claim, wherein all of the condensate feedstock is contained in the combination of the light fraction stream and the heavy fraction stream.

Aspect 5. The method of any previous claim, wherein the cat-cracked naphtha stream and the light fraction stream are passed to the gasoline preparation unit.

Aspect 6. The method of claim 5, wherein the second separation unit further forms: a fuel gas stream; a stream comprising C3-C4 paraffins and C3-C4 light olefins that is passed to an olefin separation unit; a light cycle oil stream that is passed to a diesel preparation unit; and a heavy cycle oil stream.

Aspect 7. The method of any previous claim, wherein the cat-cracked naphtha stream and the light fraction stream are passed to the mixed gas steam cracker unit.

Aspect 8. The method of claim 7, wherein the second separation unit further forms: a fuel gas stream; a stream comprising C3-C4 paraffins and C3-C4 light olefins that is passed to an olefin separation unit, to the mixed gas steam cracker unit, or both; a light cycle oil stream that is passed to a diesel preparation unit; and a heavy cycle oil stream.

Aspect 9. The method of claim 7, wherein the cat-cracked naphtha stream is processed by a saturation unit prior to being passed to the mixed feed steam cracker unit.

Aspect 10. The method of any previous claim, wherein: the cat-cracked naphtha and the light fraction stream are passed or the mixed gas steam cracker unit; and the light fraction stream has a maximum boiling point of from 230° C. to 260° C. and the heavy fraction stream has a minimum boiling point of from 230° C. to 260° C.

Aspect 11. The method of claim 10, wherein the second separation unit further forms: a fuel gas stream; a stream comprising C3-C4 paraffins and C3-C4 light olefins that is passed to an olefin separation unit, to the mixed feed steam cracker unit, or both; a light cycle oil stream that is passed to a diesel preparation unit; and a heavy cycle oil stream.

Aspect 12. The method of claim 10, wherein the cat-cracked naphtha is processed by a saturation unit prior to being passed to the mixed feed steam cracker unit.

Aspect 13. A method for processing a condensate feedstock, the method comprising: passing the condensate feedstock to a first separation unit, and separating the condensate feedstock into at least a light fraction stream, an intermediate fraction stream, and a heavy fraction stream, wherein: the light fraction stream has a maximum boiling point that is about equal to a minimum boiling point of the intermediate fraction stream, and the intermediate fraction stream has a maximum boiling point that is about equal to a minimum boiling point of the heavy fraction stream; the light fraction stream has a maximum boiling point of from 170° C. to 200° C. and the intermediate fraction stream has a minimum boiling point of from 170° C. 200° C.; the intermediate fraction stream has a maximum boiling point of from 230° C. to 380° C. and the heavy fraction stream has a minimum boiling point of from 230° C. to 380° C.; and at least 90 wt. % of the condensate feedstock is contained in the combination of the light fraction stream, the intermediate fraction stream, and the heavy fraction stream; cracking the heavy fraction stream in an FCC reactor to form an FCC effluent; passing the FCC effluent to a second separation unit to form a cat-cracked naphtha stream; passing the cat-cracked naphtha stream and the light fraction stream to a catalytic reformer to form a reformer effluent; and passing the reformer effluent and the intermediate fraction stream to a gasoline preparation unit.

Aspect 14. The method of claim 13, wherein one or more of: the condensate feedstock has an API gravity of from 45 degrees to 55 degrees; the condensate feedstock has a final boiling point of from 550 to 650° C.; or the condensate feedstock has less than or equal to 2 wt. % boiling above 565° C.

Aspect 15. The method of claim 13 or 14, further comprising removing at least a portion of salt from the condensate feedstock prior to passing the condensate feedstock to the first separation device.

Aspect 16. The method of any of claims 13-15, wherein the second separation unit further forms: a fuel gas stream; a stream comprising C3-C4 paraffins and C3-C4 light olefins that is passed to an olefin separation unit; a light cycle oil stream that is passed to a diesel preparation unit; and a heavy cycle oil stream.

Aspect 17. A method for processing a condensate feedstock, the method comprising: passing the condensate feedstock to a first separation unit, and separating the condensate feedstock into at least a light fraction stream, an intermediate fraction stream, and a heavy fraction stream, wherein: the light fraction stream has a maximum boiling point that is about equal to a minimum boiling point of the intermediate fraction stream, and the intermediate fraction stream has a maximum boiling point that is about equal to a minimum boiling point of the heavy fraction stream; the light fraction stream has a maximum boiling point of from 170° C. to 200° C. and the intermediate fraction stream has a minimum boiling point of from 170° C. 200° C.; the intermediate fraction stream has a maximum boiling point of from 230° C. to 380° C. and the heavy fraction stream has a minimum boiling point of from 230° C. to 380° C.; and at least 90 wt. % of the condensate feedstock is contained in the combination of the light fraction stream, the intermediate fraction stream, and the heavy fraction stream; cracking the heavy fraction stream in an FCC reactor to form an FCC effluent; passing the FCC effluent to a second separation unit to form at least a cat-cracked naphtha stream and a light cycle oil stream; passing the cat-cracked naphtha stream to a saturation unit; passing the saturation unit effluent and the light fraction stream to a mixed feed steam cracker unit; passing the light cycle oil stream and the intermediate fraction stream to a kerosene preparation unit.

Aspect 18. The method of claim 17, wherein one or more of: the condensate feedstock has an API gravity of from 45 degrees to 55 degrees; the condensate feedstock has a final boiling point of from 550 to 650° C.; or the condensate feedstock has less than or equal to 2 wt. % boiling above 565° C.

Aspect 19. The method of claim 17 or 18, wherein the cat-cracked naphtha stream is processed by a saturation unit prior to being passed to the mixed feed steam cracker unit.

Aspect 20. The method of any of claims 17-19, wherein the second separation unit further forms: a fuel gas stream; a stream comprising C3-C4 paraffins and C3-C4 light olefins that is passed to an olefin separation unit, to the mixed gas steam cracker unit, or both; and a heavy cycle oil stream.

For the purposes of describing and defining the present disclosure it is noted that the terms "about" or "approximately" are utilized in this disclosure to represent the inherent degree of uncertainty that may be attributed to any quantitative comparison, value, measurement, or other representation. The terms "about" and/or "approximately" are also utilized in this disclosure to represent the degree by which a quantitative representation may vary from a stated reference without resulting in a change in the basic function of the subject matter at issue.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

It is also noted that recitations herein of "at least one" component, element, etc., should not be used to create an inference that the alternative use of the articles "a" or "an" should be limited to a single component, element, etc.

What is claimed is:

1. A method for processing a condensate feedstock, the method comprising:

passing the condensate feedstock to a first separation unit, and separating the condensate feedstock into at least a light fraction stream and a heavy fraction stream, wherein:

the light fraction stream has a maximum boiling point that is about equal to a minimum boiling point of the heavy fraction stream;

the light fraction stream has a maximum boiling point of from 170° C. to 260° C. and the heavy fraction stream has a minimum boiling point of from 170° C. to 260° C.; and at least 90 wt. % of the condensate feedstock is contained in the combination of the light fraction stream and the heavy fraction stream;

cracking the heavy fraction stream in an FCC reactor to form an FCC effluent;

passing the FCC effluent to a second separation unit to form a cat-cracked naphtha stream; and passing the cat-cracked naphtha stream and the light fraction stream to a gasoline preparation unit or to a mixed feed steam cracker unit.

2. The method of claim 1, wherein one or more of:

the condensate feedstock has an API gravity of from 45 degrees to 55 degrees;

the condensate feedstock has a final boiling point of from 550 to 650° C.; or the condensate feedstock has less than or equal to 2 wt. % boiling above 565° C.

3. The method of claim 1, further comprising removing at least a portion of salt from the condensate feedstock prior to passing the condensate feedstock to the first separation device.

4. The method of claim 1, wherein all of the condensate feedstock is contained in the combination of the light fraction stream and the heavy fraction stream.

5. The method of claim 1, wherein the cat-cracked naphtha stream and the light fraction stream are passed to the gasoline preparation unit.

6. The method of claim 5, wherein the second separation unit further forms:

a fuel gas stream;

a stream comprising $C_3$-$C_4$ paraffins and $C_3$-$C_4$ light olefins that is passed to an olefin separation unit;

a light cycle oil stream that is passed to a diesel preparation unit; and a heavy cycle oil stream.

7. The method of claim 1, wherein the cat-cracked naphtha stream and the light fraction stream are passed to the mixed gas steam cracker unit.

8. The method of claim 7, wherein the second separation unit further forms:

a fuel gas stream;

a stream comprising $C_3$-$C_4$ paraffins and $C_3$-$C_4$ light olefins that is passed to an olefin separation unit, to the mixed gas steam cracker unit, or both;

a light cycle oil stream that is passed to a diesel preparation unit; and a heavy cycle oil stream.

9. The method of claim 7, wherein the cat-cracked naphtha stream is processed by a saturation unit prior to being passed to the mixed feed steam cracker unit.

10. The method of claim 1, wherein:

the cat-cracked naphtha and the light fraction stream are passed to the mixed gas steam cracker unit; and the light fraction stream has a maximum boiling point of from 230° C. to 260° C. and the heavy fraction stream has a minimum boiling point of from 230° C. to 260° C.

11. The method of claim 10, wherein the second separation unit further forms:

a fuel gas stream;

a stream comprising $C_3$-$C_4$ paraffins and $C_3$-$C_4$ light olefins that is passed to an olefin separation unit, to the mixed feed steam cracker unit, or both;

a light cycle oil stream that is passed to a diesel preparation unit; and a heavy cycle oil stream.

12. The method of claim 10, wherein the cat-cracked naphtha is processed by a saturation unit prior to being passed to the mixed feed steam cracker unit.

13. A method for processing a condensate feedstock, the method comprising:

passing the condensate feedstock to a first separation unit, and separating the condensate feedstock into at least a light fraction stream, an intermediate fraction stream, and a heavy fraction stream, wherein:

the light fraction stream has a maximum boiling point that is about equal to a minimum boiling point of the intermediate fraction stream, and the intermediate fraction stream has a maximum boiling point that is about equal to a minimum boiling point of the heavy fraction stream;

the light fraction stream has a maximum boiling point of from 170° C. to 200° C. and the intermediate fraction stream has a minimum boiling point of from 170° C. 200° C.;

the intermediate fraction stream has a maximum boiling point of from 230° C. to 380° C. and the heavy fraction stream has a minimum boiling point of from 230° C. to 380° C.; and at least 90 wt. % of the condensate feedstock is contained in the combination of the light fraction stream, the intermediate fraction stream, and the heavy fraction stream;

cracking the heavy fraction stream in an FCC reactor to form an FCC effluent;

passing the FCC effluent to a second separation unit to form a cat-cracked naphtha stream;

passing the cat-cracked naphtha stream and the light fraction stream to a catalytic reformer to form a reformer effluent; and passing the reformer effluent and the intermediate fraction stream to a gasoline preparation unit.

14. The method of claim 13, wherein one or more of:

the condensate feedstock has an API gravity of from 45 degrees to 55 degrees;

the condensate feedstock has a final boiling point of from 550 to 650° C.; or the condensate feedstock has less than or equal to 2 wt. % boiling above 565° C.

15. The method of claim 13, further comprising removing at least a portion of salt from the condensate feedstock prior to passing the condensate feedstock to the first separation device.

16. The method of claim 13, wherein the second separation unit further forms:

a fuel gas stream;

a stream comprising $C_3$-$C_4$ paraffins and $C_3$-$C_4$ light olefins that is passed to an olefin separation unit;

a light cycle oil stream that is passed to a diesel preparation unit; and a heavy cycle oil stream.

17. A method for processing a condensate feedstock, the method comprising:

passing the condensate feedstock to a first separation unit, and separating the condensate feedstock into at least a light fraction stream, an intermediate fraction stream, and a heavy fraction stream, wherein:

the light fraction stream has a maximum boiling point that is about equal to a minimum boiling point of the intermediate fraction stream, and the intermediate fraction stream has a maximum boiling point that is about equal to a minimum boiling point of the heavy fraction stream;

the light fraction stream has a maximum boiling point of from 170° C. to 200° C. and the intermediate fraction stream has a minimum boiling point of from 170° C. 200° C.;

the intermediate fraction stream has a maximum boiling point of from 230° C. to 380° C. and the heavy fraction stream has a minimum boiling point of from 230° C. to 380° C.; and at least 90 wt. % of the condensate feedstock is contained in the combination of the light fraction stream, the intermediate fraction stream, and the heavy fraction stream;

cracking the heavy fraction stream in an FCC reactor to form an FCC effluent;

passing the FCC effluent to a second separation unit to form at least a cat-cracked naphtha stream and a light cycle oil stream;

passing the cat-cracked naphtha stream to a saturation unit;

passing the saturation unit effluent and the light fraction stream to a mixed feed steam cracker unit; and passing the light cycle oil stream and the intermediate fraction stream to a kerosene preparation unit.

18. The method of claim 17, wherein one or more of:

the condensate feedstock has an API gravity of from 45 degrees to 55 degrees;

the condensate feedstock has a final boiling point of from 550 to 650° C.; or the condensate feedstock has less than or equal to 2 wt. % boiling above 565° C.

19. The method of claim 17, wherein the cat-cracked naphtha stream is processed by a saturation unit prior to being passed to the mixed feed steam cracker unit.

20. The method of claim 17, wherein the second separation unit further forms:

a fuel gas stream;

a stream comprising $C_3$-$C_4$ paraffins and $C_3$-$C_4$ light olefins that is passed to an olefin separation unit, to the mixed gas steam cracker unit, or both; and a heavy cycle oil stream.

* * * * *